350-166
7/10/79 XR 4,161,015
SR

United States Patent [19]

Dey et al.

[11] 4,161,015

[45] Jul. 10, 1979

[54] LUMINAIRE USING A MULTILAYER INTERFERENCE MIRROR

[75] Inventors: Thomas W. Dey; Eugene C. Letter, both of Rochester, N.Y.

[73] Assignee: Bausch & Lomb Incorporated, Rochester, N.Y.

[21] Appl. No.: 821,129

[22] Filed: Aug. 1, 1977

Related U.S. Application Data

[63] Continuation-in-part of Ser. No. 716,409, Aug. 23, 1976, abandoned.

[51] Int. Cl.[2] ........................... F21V 9/00; G02B 5/28

[52] U.S. Cl. .................................... 362/263; 362/341; 350/166

[58] Field of Search ........... 240/92, 93, 103 R, 106 R, 240/46.45, 46.47, 11.4 N, 11.4 H, 11.4 R, 9 R, 1 M, 25, 41.37, 41.38, 41.4 R; 350/164–166; 362/1–2, 263, 293, 311, 330, 333, 355

[56] References Cited

U.S. PATENT DOCUMENTS

| | | | |
|---|---|---|---|
| 3,188,513 | 6/1965 | Hansler | 350/166 |
| 3,247,609 | 4/1966 | Hayes et al. | 350/166 |
| 3,528,725 | 9/1970 | Barkley | 350/166 |
| 3,612,655 | 10/1971 | Buchan et al. | 350/163 X |
| 3,712,980 | 1/1973 | Norton | 350/166 |

*Primary Examiner*—William M. Shoop
*Assistant Examiner*—Peter S. Wong
*Attorney, Agent, or Firm*—Frank C. Parker; Bernard D. Bogdon

[57] ABSTRACT

A luminaire is provided which includes a reflector, a light source and a multilayer interference mirror. The light source is selected to emit monochromatic light. The multilayer interference mirror is disposed in a path of light emitted from the light source and is designed for angularly selecting a portion of the light arriving from a multiplicity of directions for passage into a control range.

6 Claims, 6 Drawing Figures

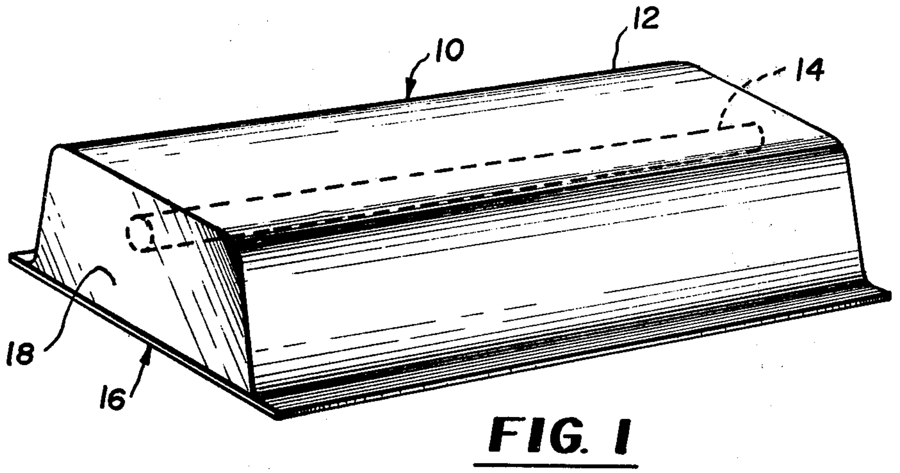
FIG. 1
FIG. 2
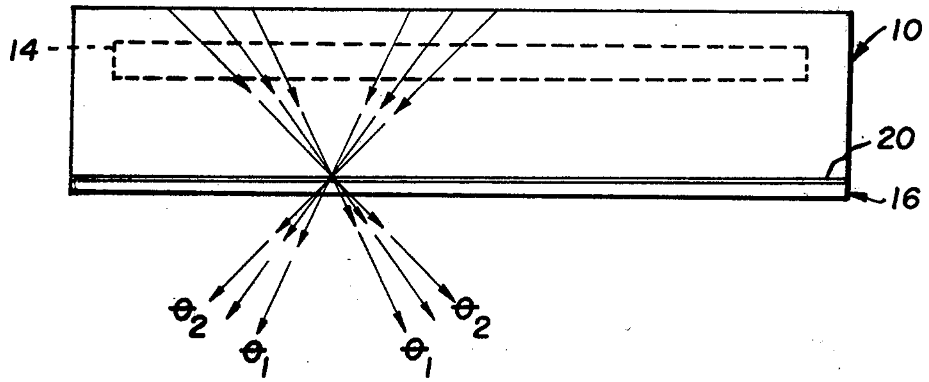
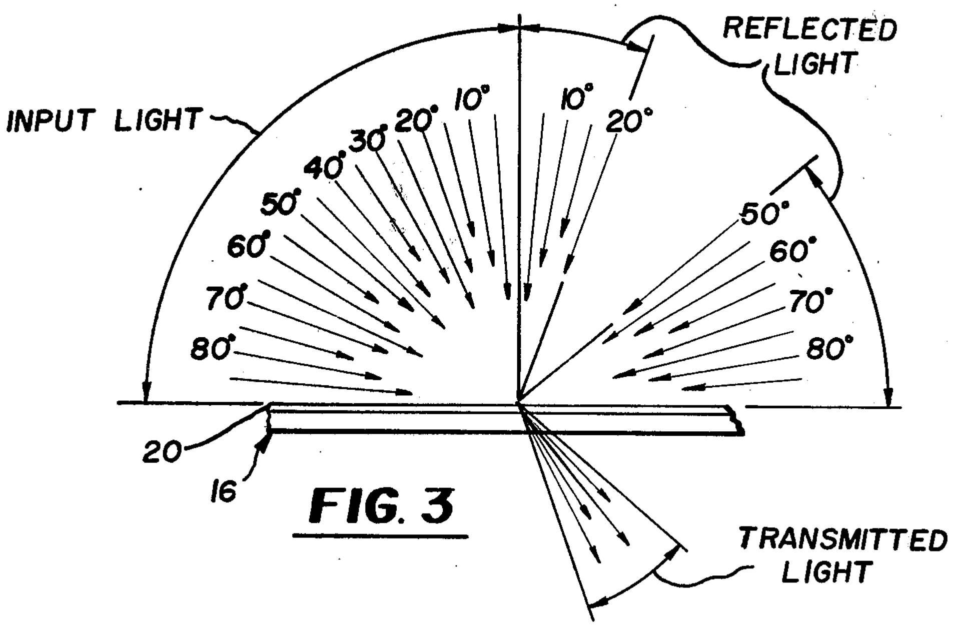
FIG. 3

LUMINAIRE USING A MULTILAYER INTERFERENCE MIRROR

CROSS-REFERENCES TO RELATED APPLICATIONS

This disclosure is a continuation-in-part of U.S. Pat. application Ser. No. 716,409, filed Aug. 23, 1976 now abandoned entitled "A Luminaire Using A Multilayer Interference Mirror" which has the same assignee and inventors common to the present disclosure. This patent application corresponds and is related to commonly assigned and concurrently filed copending patent application disclosure entitled "A Luminaire Having A Configured Interference Mirror And Reflector", U.S. Pat. application Ser. No. 821,044 for inventors T. Dey, J. Howe and E. Letter, which application is a continuation-in-part of U.S. Pat. application Ser. No. 716,415 filed Aug. 23, 1976 now abandoned entitled "Task Area Luminaire" and U.S. Pat. application Ser. No. 786,710 filed Apr. 11, 1977 now abandoned entitled "A Luminaire Having A Configured Interference Mirror And Reflector".

BACKGROUND OF THE INVENTION

During the past few years the world has become increasingly aware that the amount of available energy is being rapidly depleted. To make better use of the remaining available energy, all types of devices are being improved with a view toward conserving energy. One such device that has lagged in substantial improvement is the luminaire used in the lighting industry. Normally, these luminaires are used to illuminate general interior and exterior areas, such as, rooms, hallways or stairs in buildings, parking lots and tennis courts. The light emitted from these luminaires is normally designed to eliminate glare by simply controlling the distribution of light or polarizing the light within the general areas. It is through the control of the light that better illumination is obtained with less energy use.

The most common of these luminaires simply distributes the light within a general area and makes use of a reflector having an aperture, a fluorescent light source and a lighting panel disposed across the aperture. The light arriving at the aperture, either directly from the light source or reflected from the reflector, is generally diffused across the lighting panel from a multiplicity of directions. The lighting panel normally has a surface with a grouping of lenticular elements. These elements are designed to reflect the undesired light back into the luminaire and to refract the desired light into a distribution pattern. When the luminaire illuminates a room, the industry has found the most preferred distribution to be in the form of what is known in the art as a "batwing" lighting pattern. When the light emitted from the luminaire is polarized light, the lighting panel may be constructed from birefringent or multilayered polarizers, with the light having improper orientation being reflected back into the luminaire and the light having proper orientation passing into the illumination area.

SUMMARY OF THE INVENTION

The present invention involves a luminaire embodying a reflector, a light source element and a multilayer interference mirror element. The light source element is disposed within the reflector and is selected to emit monochromatic light. The multilayer interference mirror is disposed on a supporting substrate in a path of the light arriving from a multiplicity of directions and is designed for angularly selecting a portion of light for passage into a control range.

BRIEF DESCRIPTION OF THE DRAWINGS

Objects and advantages of the invention will become apparent upon reading the following description and upon reference to the drawings, in which like reference numerals refer to like elements in the various views:

FIG. 1 is a perspective view of a luminaire embodying the invention.

FIG. 2 is an elevational view of the embodiment of the invention illustrated in FIG. 1.

FIG. 3 is a partially diagrammatic and partially sectional view of a portion of the embodiment of FIG. 1.

DETAILED DESCRIPTION OF THE PREFERRED EMBODIMENTS

Figures 4, 5, 6:
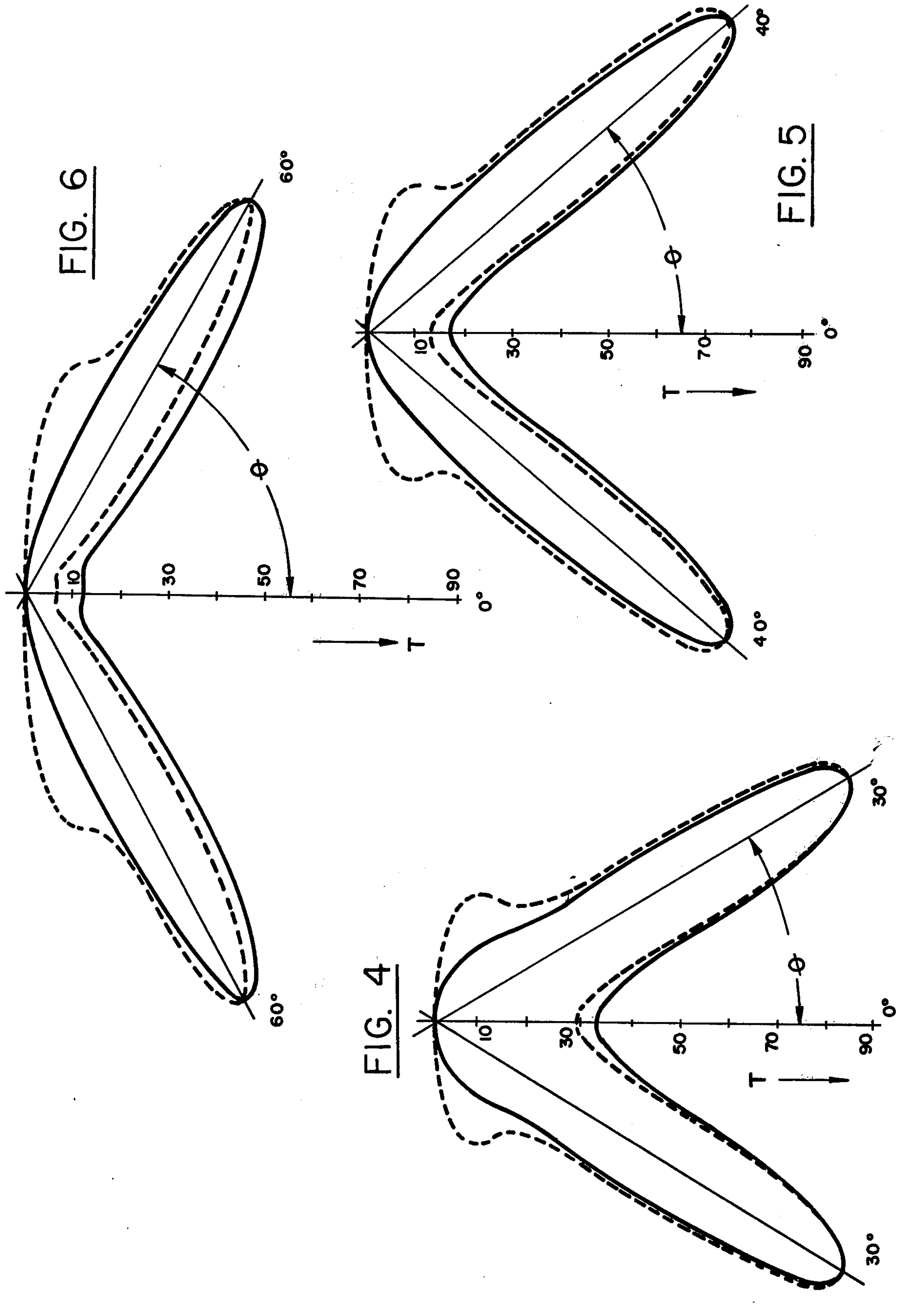
FIG. 4 is an exemplary radial light distribution pattern according to the principles of the present invention.
FIG. 5 is another exemplary radial light distribution pattern according to the principles of the present invention.
FIG. 6 is still another exemplary radial light distribution pattern according to the principles of the present invention.

As best seen in FIG. 1, luminaire 10 has a reflector 12, a light source 14 and a lighting panel 16. Reflector 12 is constructed to reflect light emitted from light source 14 across an aperture 18. Preferably, reflector 12 is constructed to provide diffused light at aperture 18, as illustrated in FIG. 2. This diffused light may be obtained by providing reflector 12 with a stippled specular reflecting surface or with a matte non-specular reflecting surface.

Light source 14 is selected to fit within reflector 12 and emits monochromatic light in a multiplicity of directions across aperture 18. Monochromatic light is defined as that light of which the luminous flux falls within a bandwidth of 40 nanometers. Some examples of light sources providing such monochromatic light are low pressure sodium, light emitting diodes, neon and lasers. Preferably, low pressure sodium lamps are used, such as that designated by the IES Lighting Handbook as SOX 180W.

Lighting panel 16 is constructed to cover aperture 18 of reflector 12. At least one side of panel 16 is provided with a smooth surface to permit a multilayer interference mirror 20 to be deposited thereon. The other side of panel 16 may be constructed with a smooth surface, with a surface to diffuse the light or with a surface to refract the light. When desired, a multilayer interference mirror may be deposited on both sides of panel 16. Preferably, as shown in FIG. 3, both sides of panel 16 are smooth with a surface having multilayer interference mirror 20 deposited thereon facing the incoming light rays.

Multilayer interference mirror 20 is a multiple layered film stack that selectively reflects and transmits light as a function of wavelength and angle of incidence by the phenomena of optical interference. Such mirrors are well known in the optical thin film art and their design is determined by the desired amount of reflection and transmission of light. The reflection and transmission is dependent on the wavelength of light passing through the multilayer, the thickness and index of refraction of the materials used in each layer of the multilayer stack and the angle of incidence of the incoming light rays. Formulas that may be used in designing multilayer interference mirror 20 are well known in the optical thin film art and have been set forth by H. A. Macleod in *Thin-Film Optical Filters,* American Elsevier Publishing Company, Inc., 1969.

In the preferred embodiment of the present invention, luminaire 10 is designed to distribute light within a control range between $\theta_1$ and $\theta_2$ where $\theta$ generally represents the angle from a line of reference normal to the luminaire panel to the light in the control range. More specifically, the light is distributed in a "batwing" lighting pattern centered substantially between 25° and 65° from and symmetrically disposed about a perpendicular to the smooth surface of panel 16. Even higher angles approaching 90°, may be obtained if desired. Higher angles may result in possible losses of efficiency. To obtain this desired result, multilayer interference mirror 20 is constructed to angularly select a portion of the light arriving from a multiplicity of directions for passage into the control range. As shown in FIGS. 2 and 3, the light arrives at aperture 18 from a multiplicity of directions resulting from the direct emission of light from source 14 and the reflection of light from reflector 12.

Since the light source 14 is selected to provide monochromatic light and, for design purposes, the angle of incidence of the incoming light rays is equal to the angle of incidence of the outgoing light rays, then the thickness and index of refraction of the materials in each layer of the multilayer stack are the only determinations which must be made. Once the thickness and materials used in each layer of the multilayer stack are selected, mirror 20 can be disposed on a suitable substrate such as panel 16. The light permitted to pass will be distributed within the control range, while the light reflected from mirror 20 will in turn be reflected from reflector 12 for diffusion over mirror 20.

Examples of film designs which may be used to accomplish this distribution of light into such desired control ranges include, but are not limited to the following examples:

| Layer | Index | $\theta$ = 30° | $\theta$ = 40° | $\theta$ = 60° |
|---|---|---|---|---|
| Glass Side | | | | |
| 1 | H | .128 | .130 | .134 |
| 2 | L | .268 | .283 | .321 |
| 3 | H | .256 | .260 | .269 |
| 4 | L | .268 | .283 | .321 |
| 5 | H | .512 | .520 | .538 |
| 6 | L | .268 | .283 | .321 |
| 7 | H | .256 | .260 | .269 |
| 8 | L | .268 | .283 | .321 |
| 9 | H | .128 | .130 | .134 |
| Air Side | | | | |

In these examples for patterns substantially centered about 30°, 40° and 60°, the unit of measure used is optical thickness measured in wavelengths of sodium light at 0.589μ; H refers to a high index layer of the multilayer interference mirror, in these examples of zinc sulfide (ZnS) having an index of refraction of 2.35 at 0.589μ; and L refers to a low index layer of the multilayer interference mirror, in this example magnesium fluoride ($MgF_2$) having an index of refraction of 1.38 at 0.589μ.

The distribution pattern of light from the luminaire is primarily determined by three factors. A first and very significant light controlling factor is a film design characterized by a batwing transmittance function. This pattern is affected by the second factor, the natural cosine distribution characteristic of the diffuse reflector. This contributes to a reduction of high-angle direct glare. Finally, the reflector shape can be such to affect the distribution of light to a varied extent of influence. In this invention, for reasons of choice and unlike some luminaires, a diffuse reflector is used and therefore the shape of the reflector is not critical and has little effect upon the distribution of light. In other designs the reflector shape can have a great influence on the light distribution. The latitude in this design parameter for this invention allows a variety of reflector shapes to perform effectively. Control of light is principally controlled by the film design.

FIGS. 4, 5 and 6, for distribution centered about $\theta$ at 30°, 40° and 60° from an axis normal to the task surface, illustrate these control conditions as calculated. The dotted line in each figure indicates the transmittance function. The solid line in each figure corresponds to luminaire output as measured in candlepower and results from the cosine modification characteristic of the diffuse reflector. The transmittance (T), as illustrated in FIGS. 4, 5 and 6 is defined by the fraction of light transmitted by the film.

The following lists illustrate, for example, values illustrated by FIGS. 4, 5 and 6, respectively:

| | $\theta$ | $t(\theta)$ | $t(\theta)\cos\theta$ | $t(\theta)\cos(\theta)$ (normalized to peak at t max.) |
|---|---|---|---|---|
| (a) | 0° | .28 | .28 | .32 |
| | 10 | .33 | .32 | .37 |
| | 20 | .57 | .54 | .62 |
| | 30 | .98 | .85 | .98 |
| | 40 | .53 | .41 | .47 |
| | 50 | .30 | .19 | .22 |
| | 60 | .27 | .14 | .16 |
| | 70 | .27 | .09 | .10 |
| | 80 | .21 | .04 | .05 |
| (b) | 0° | .12 | .12 | .16 |
| | 10 | .14 | .14 | .18 |
| | 20 | .20 | .19 | .25 |
| | 30 | .45 | .39 | .51 |
| | 40 | .97 | .74 | .97 |
| | 50 | .47 | .30 | .39 |
| | 60 | .33 | .17 | .22 |
| | 70 | .31 | .11 | .14 |
| | 80 | .24 | . 4 | . 5 |
| | 85 | .15 | . 1 | . 1 |
| (c) | 0° | .06 | .06 | .12 |
| | 10 | .06 | .06 | .12 |
| | 20 | .06 | .06 | .12 |
| | 30 | .08 | .07 | .14 |
| | 40 | .17 | .13 | .26 |
| | 50 | .44 | .28 | .56 |
| | 60 | .94 | .47 | .94 |
| | 70 | .52 | .18 | .36 |
| | 80 | .44 | .08 | .16 |

In these above (a), (b) and (c) lists, $t(\theta)$ is the transmittance function represented by the broken line and $t(\theta)\cos(\theta)$ normalized corresponds to the solid line.

These exemplary types of designs are commonly referred to as bandpass filters. The shape of the transmittance function of the filter can be altered by changing the number of layers. It will be appreciated that many other designs can be used. For example, a low and high pass-edge filter design may be used in combination. Such design alternatives are well known in the art, and are described in the before mentioned book entitled *Thin-Film Optical Filters" by Macleod.* Alternative materials for the films such as titanium dioxide ($TiO_2$) and silicon dioxide ($SiO_2$) are also well known in the art and described in texts such as Macleod's.

From the foregoing, it will be seen that novel and advantageous provision has been made for carrying out the desired end. However, attention is again directed to the fact that variations may be made in the example method and apparatus disclosed herein without departing from the spirit and scope of the invention, as defined in the appended claims.

It is claimed:

1. A luminaire assembly of high illumination efficiency for controlling the direction of light to illuminate a task area in a controlled intensified light pattern, comprising:
   - reflector means;
   - light source means disposed within said reflector means for emitting monochromatic light; and
   - multilayer interference mirror means disposed on a supporting substrate for receiving light emitted directly from said light source means and light reflected from said reflector means for passing therethrough light received at predetermined angles of incidence and for reflecting other light emitted from the light source means and reflected from the reflector means which other light is thereafter again received by the multilayer interference mirror means after being reflected by said reflector means for passage through the multilayer interference mirror means at the predetermined angles of incidence for said multilayer interference mirror means to intensify by controlling the angular direction of light passing therethrough for passage of said light into a control range to illuminate the task area in a controlled intensified light pattern.

2. The luminaire assembly as defined in claim 1, wherein said light source means is a low pressure sodium light source for emitting monochromatic light.

3. The luminaire assembly as defined in claim 1, wherein said reflector means defines an aperture and reflects to provide diffused light at the aperture, and further includes a lighting panel disposed across the aperture with at least one smooth surface, said multilayer interference mirror means being disposed on the smooth surface, and wherein the control range is substantially between 25° and 65° from and symmetrically disposed about a perpendicular to the smooth surface.

4. The luminaire assembly as defined in claim 3, wherein the smooth surface of said lighting panel having said multilayer interference mirror disposed thereon faces said light source means.

5. A luminaire assembly providing high efficiency illumination of a task area by controlling the direction of light, to illuminate the task area in a controlled pattern of intensified light, comprising:
   - reflector means defining an aperture for reflecting light to cross the aperture from a multiplicity of directions;
   - light source means operating under low pressure disposed within said reflector means for emitting monochromatic light;
   - a lighting panel disposed across the aperture defined by said reflector means and having first and second substantially smooth surfaces, the first substantially smooth surface facing said light source means and the second substantially smooth surface facing away from said light source means; and
   - multilayer interference mirror means supported on the first substantially smooth surface of said lighting panel receiving light from a multiplicity of directions from the reflector means and the light source means for passing therethrough light received at predetermined angles into a control range substantially between 25° and 65° from and symmetrically disposed about a perpendicular to the first substantially smooth surface to provide intensified illumination of the task area through the controlled angular direction of light passing through the multilayer interference mirror means.

6. A luminaire lighting system providing intensified illumination of a task area by angularly controlling the distribution of light directed to the task area, comprising:
   - low pressure light source means for emitting monochromatic light;
   - reflector means defining an aperture and disposed about said low pressure light source means for reflecting the light to provide diffused light across the aperture;
   - a lighting panel disposed across the aperture defined by said reflector means and having first and second surfaces, at least one of which is substantially smooth, and wherein the first surface faces said light source means and the second surface faces away from said light source means; and
   - multilayer interference mirror means supported on the smooth surface of said lighting panel receiving light from a multiplicity of directions, which light includes diffused light provided by the reflector means, for passing through the multilayer interference mirror means that portion of the light received from selected angular directions into a control range substantially centered about an angle between 25° and 65° from and symmetrically disposed about a perpendicular to the first surface to provide intensified illumination of the task area by controlling the angular direction of light passing through the multilayer interference mirror means within the control range.

* * * * *

UNITED STATES PATENT AND TRADEMARK OFFICE

CERTIFICATE OF CORRECTION

PATENT NO. : 4,161,015

DATED : July 10, 1979

INVENTOR(S) : Thomas W. Dey et al

It is certified that error appears in the above-identified patent and that said Letters Patent are hereby corrected as shown below:

Col. 5, line 45, after "reflects" insert --light--.

Signed and Sealed this

*Twenty-third* Day of *October 1979*

[SEAL]

*Attest:*

RUTH C. MASON
*Attesting Officer*

LUTRELLE F. PARKER
*Acting Commissioner of Patents and Trademarks*